(12) United States Patent
Baluja et al.

(10) Patent No.: US 7,891,005 B1
(45) Date of Patent: Feb. 15, 2011

(54) VERIFYING HUMAN INTERACTION VIA ROTATED IMAGES

(75) Inventors: Shumeet Baluja, Santa Clara, CA (US); Maryam Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 922 days.

(21) Appl. No.: 11/502,993

(22) Filed: Aug. 10, 2006

(51) Int. Cl.
  *G06F 7/04* (2006.01)
(52) U.S. Cl. .............................. 726/26; 713/182; 726/3
(58) Field of Classification Search ................ 726/2–4, 726/26–28; 713/182, 185; 705/50–51
  See application file for complete search history.

(56) References Cited

U.S. PATENT DOCUMENTS

| | | | |
|---|---|---|---|
| 6,195,698 B1 | 2/2001 | Lillibridge et al. | 709/225 |
| 7,533,411 B2 * | 5/2009 | Goodman et al. | 726/21 |
| 2003/0099395 A1 * | 5/2003 | Wang et al. | 382/165 |
| 2004/0073813 A1 * | 4/2004 | Pinkas et al. | 713/202 |
| 2004/0199597 A1 * | 10/2004 | Libbey et al. | 709/207 |
| 2005/0065802 A1 * | 3/2005 | Rui et al. | 705/1 |
| 2005/0097175 A1 * | 5/2005 | Vandeputte | 709/206 |
| 2005/0120201 A1 * | 6/2005 | Benaloh et al. | 713/155 |
| 2005/0138376 A1 * | 6/2005 | Fritz et al. | 713/168 |
| 2005/0229251 A1 * | 10/2005 | Chellapilla et al. | 726/23 |
| 2005/0246775 A1 * | 11/2005 | Chellapilla et al. | 726/22 |
| 2005/0289345 A1 * | 12/2005 | Haas et al. | 713/170 |

OTHER PUBLICATIONS

Capili, R., "Verify All Humans!," Webmonkey/programming/, http://www.webmonkey.com//templates/print_template, 9 pgs., Nov. 23, 2005.
Kesmodel, D., "Codes on Sites 'Captcha' Anger of Web Users," The Wall Street Journal Online, http://www.online.wsj.com/public/article, 3 pgs., May 31, 2006.
Baluja, S., et al., "Large Scale Performance Measurement of Content-Based Automated Image-Orientation Detection," IEEE Conference on Image Processing, vol. 2, Sep. 11-14, 2005.
Chellapilla, K., et al. "Computers Beat Humans at Single Character Recognition in Reading Based Human Interaction Proofs (HIPS)," in Proceedings of the 3$^{rd}$ Conf. on Email and Anti-Spam, Jul. 2005.

(Continued)

*Primary Examiner*—Jung Kim
*Assistant Examiner*—Shaun Gregory
(74) *Attorney, Agent, or Firm*—Morgan, Lewis & Bockius LLP

(57) ABSTRACT

A human interaction proof may restrict access to computer systems by testing the image orientation detection capabilities of the user making the access attempt. The human interaction proof includes a challenge where a plurality of images is presented. The images in the challenge may be drawn from image databases or the Internet, and may be part of a set of images that have been screened for difficulty with respect to computers. Some of the presented images are rotated away from their proper orientations. A user presented with the challenge is asked to differentiate the rotated images from the non-rotated images. A correct response leads to a grant of access, and an incorrect answer leads to a denial of access. The images in the challenge may be further modified with regard to color, lighting, cropping, etc. before presentation; the modifications increase the difficulty of the challenge for computers.

26 Claims, 7 Drawing Sheets

OTHER PUBLICATIONS

Lopresti, D., "Leveraging the CAPTCHA Problem," $2^{nd}$ Int'l Workshop on Human Interactive Proofs, Bethlehem, PA, May 2005.

Lopresti, D., "Leveraging the CAPTCHA Problem," Computer Science & Engineering, Lehigh Univ.

Mori, G., et al., "Recognizing Objects in Adversarial Clutter: Breaking a Visual CAPTCHA," in Proceedings of Computer Vision and Pattern Recognition, 2003.

Rowley, H.A., et al., "Neural Network-Based Face Detection," IEEE Transactions on Pattern Analysis and Machine Intelligence, vol. 20, No. 1, Jan. 1998.

Rui, Y., et al., "Characters and Faces: A User Study on Ease of Use for HIPs," Lecture Notes in Computer Science, Springer Berlin, 2005.

Vailaya, A., et al., "Automatic Image Orientation Detection," IEEE Transactions on Image Processing, vol. 11, No. 7, Jul. 2002.

Viola, P., et al., "Rapid Object Detection Using a Boosted Cascade of Simple Features," in Proceedings of Computer Vision and Pattern Recognition, pp. 511-518, 2001.

Von Ahn, L., et al., "Telling Humans and Computers Apart Automatically," Communications on the ACM, vol. 47, No. 2, Feb. 2004.

Von Ahn, L., et al., "CAPTCHA: Using Hard AI Problems for Security," in EUROCRYPT, 2003.

Wu, V., et al., "TextFinder: An Automatic System to Detect and Recognize Text in Images," Computer Science Dept., Univ. of Massachusetts, Jun. 10, 1999.

Wu, V., et al. "Finding Text in Images," Proceedings of the $2^{nd}$ ACM Int'l Conf. on Digital Libraries, 1997.

Zhang, L., et al., "Boosting Image Orientation Detection with Indoor vs. Outdoor Classification," IEEE Workshop on Applications of Computer Vision, Orlando, Florida, Dec. 3-4, 2002.

\* cited by examiner

VERIFYING HUMAN INTERACTION VIA ROTATED IMAGES

TECHNICAL FIELD

The disclosed embodiments relate generally to online security, and more particularly, to verification of interaction with a human being via rotated images.

BACKGROUND

Many services on the Internet, such as email, online polls, weblogs, and message boards, are provided free of charge to users. However, the freeness of these services leaves them vulnerable to abuse. The abuse often involves malicious users deploying automated scripts or software agents known as bots to use the services in order to send spam, engage in ballot stuffing, and so forth.

Human interaction proofs have been deployed to combat such abuse. Human interaction proofs are used to verify that the user is a human being before granting the user access. A CAPTCHA ("completely automated public Turing test to tell computers and humans apart") is an example of a human interaction proof. A commonly deployed CAPTCHA is one that asks the user to identify or recognize text characters in an image, where the text characters are visually obscured or distorted. However, much progress has been made in the development of algorithms and programs that can solve such text identification or character recognition CAPTCHAs. As a result, the deterrence effect of such CAPTCHAs has been weakened.

Accordingly, there is a need for a human interaction proof that is less vulnerable to attack.

SUMMARY

According to some embodiments, a computer-implemented method of restricting access includes receiving an access request and, in response to the access request, generating a challenge that includes a plurality of images and a question concerning orientations of the plurality of images. The method also includes transmitting the challenge for display, receiving a response to the question, and granting the access request if the response correctly answers the question.

According to some embodiments, a computer-implemented method includes selecting a candidate image from an unscreened image repository, performing an image orientation detection test on the candidate image, and if the candidate image passes the test, including the candidate image in a plurality of challenges. The method also includes logging numbers of correct and incorrect identifications of the candidate image in responses to the plurality of challenges, and if the numbers of correct and incorrect identifications for the candidate image satisfy predefined criteria, adding the candidate image to a screened image repository.

According to some embodiments, a system includes memory, one or more processors, and one or more modules stored in the memory and configured execution by the one or more processors. The one or more modules include instructions to receive a request to access the system; instructions to, in response to the request, generate a challenge that includes a plurality of images and a question concerning orientations of the plurality of images; instructions to transmit for display the challenge; instructions to receive a response to the question; and instructions to grant the request if the response correctly answers the question.

According to some embodiments, a computer program product for use in conjunction with a computer system includes a computer program mechanism. The computer program mechanism includes instructions for performing the steps of receiving an access request; in response to the access request, generating a challenge that includes a plurality of images and a question concerning orientations of the plurality of images; transmitting for display the challenge; receiving a response to the question; and granting the access request if the response correctly answers the question.

BRIEF DESCRIPTION OF THE DRAWINGS

Like reference numerals refer to corresponding parts throughout the drawings.

DESCRIPTION OF EMBODIMENTS

A human interaction proof (HIP) based on image orientation detection involves displaying a plurality of images, some of which have been rotated away from their "upright" orientations. A user attempting to open an account or to otherwise access a service at a computer system may be asked to solve such a HIP by answering a question concerning the orientations of the images, such as identifying which of the images are not "upright."

Figure 1:
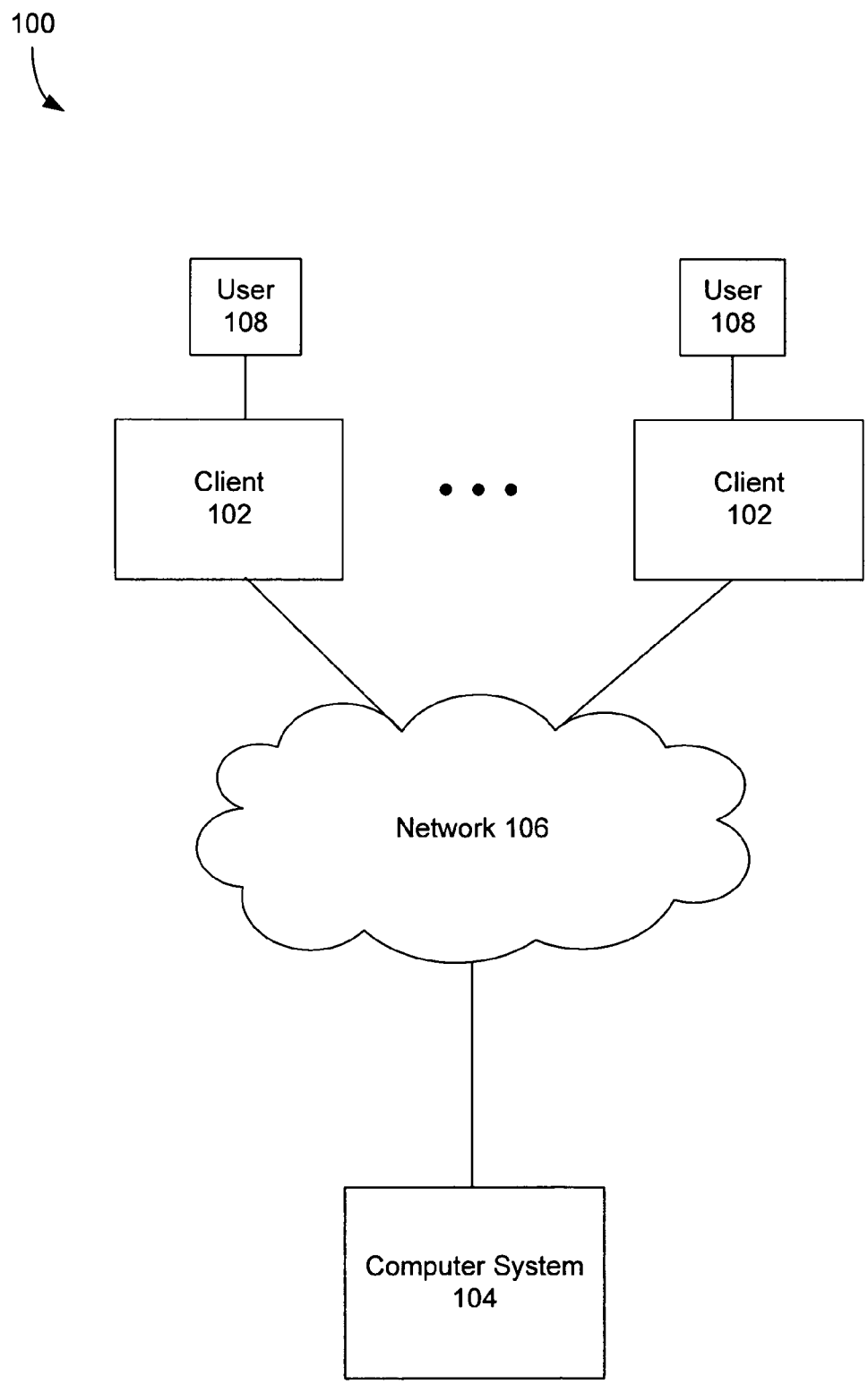
FIG. 1 is a block diagram illustrating a computer network in accordance with some embodiments.

FIG. 1 is a block diagram illustrating a computer network in accordance with some embodiments. The computer network 100 includes one or more clients 102 and a computer system 104, and a network 106 interconnecting these components. The network 106 may include, without limitation, local-area networks (LAN), wide-area networks (WAN), wireless networks, and the Internet.

The computer system 104 provides services to users 108 of clients 102. Such services may include email, message boards or forums, online surveys or polls, and weblogs (blogs). Some of these services may require that the user open an account with the computer system 104 or the service. For example, accounts are often required for email and weblog services, so that the user's email messages and weblog posts may be associated with the user. In some embodiments, the interface to the services is a Web-based interface, using pages written in the Hypertext Markup Language (HTML) and perhaps other languages. The Web-based interface may be accessed via a client application such as a web browser. The computer system 104 may include one or more servers. The servers may perform a variety of functions, including provision of the services and managing accounts and access to the services.

The clients 102 are devices from which a user may access services on the computer system 104. The client 102 may be any device capable of communicating with other computers, devices, and so forth through the network 106. Examples of client devices may include, without limitation, desktop computers, notebook (or laptop) computers, personal digital assistants (PDAs), mobile phones, network terminals, and so forth. In some embodiments, the client device includes one or more applications for communicating with other computers or devices through the network 106. Examples of such applications include, without limitation, web browsers, email applications, and instant messaging or chat applications.

Each client 102 may be operated by a user 108. That is, the user 108 may activate or deactivate programs or operations, including communications with the computer system 104, on the client 102. The user 108 may be a human being or automated computer program (e.g., an automated script or a bot). A computer program acting as the user can access and use the same services that the human user can access and use, but often at a faster rate. In some embodiments, a computer program acting as the user may also run on other computers or devices connected to the network 106 and communicate with the computer system 104.

Because automated computer programs can access and utilize computer services at a faster rate than human beings, such programs are often deployed in order to abuse computer services. For example, bots may be deployed to automatically open email accounts and send many email messages, particularly spam. As another example, a bot may be deployed to access an online poll and engage in ballot stuffing.

In order to deter such abuse, human interaction proofs may be deployed. A human interaction proof is a class of techniques for verifying that the user is an actual human being rather than a computer program. A human interaction proof typically involves presenting a challenge to the user and the user providing a response to the challenge. If the user provides a correct response, the user is allowed access. If the user provides an incorrect response, the user is denied access. For human interaction proofs, the challenges are chosen such that they are relatively easy for humans to solve but are difficult for computers. A well-known example of a human interaction proof is a CAPTCHA (completely automated public Turing test to tell computers and humans apart). Information regarding use of human interaction proofs and CAPTCHAs is disclosed in U.S. Pat. No. 6,195,698, titled "Method for Selectively Restricting Access to Computer Systems;" and in Ahn et al., "Telling Humans and Computers Apart Automatically," *Communications of the ACM*, February 2004, pp. 57-60; the disclosures of which are hereby incorporated by reference in their entirety as background information.

Figure 2:
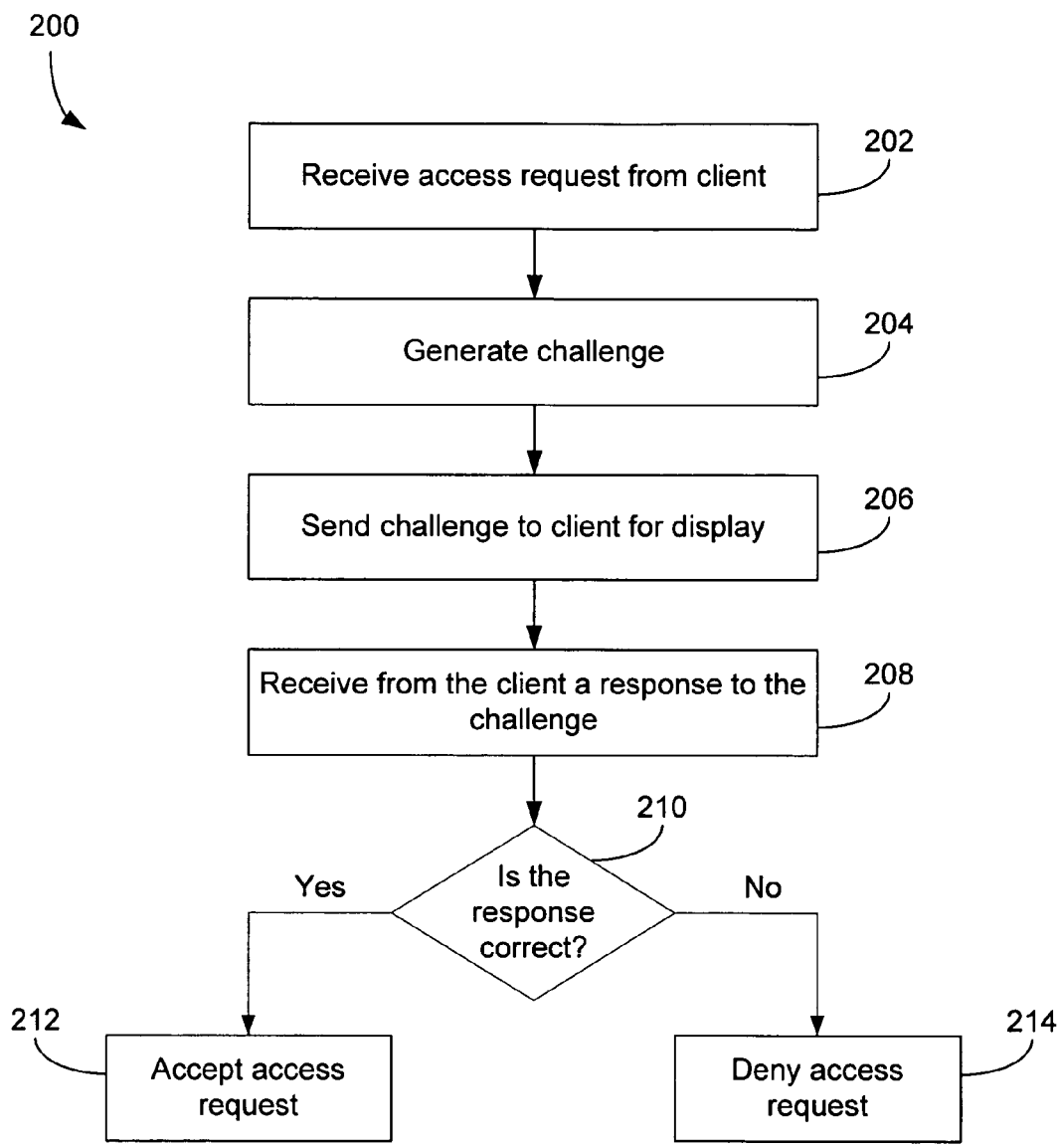
FIG. 2 is a flow diagram illustrating a process for verifying human interaction in accordance with some embodiments.

FIG. 2 is a flow diagram illustrating a process for verifying human interaction in accordance with some embodiments. Process flow 200 describes a process for verifying that a user 108 is a human being rather than a computer program and restricting access to services by computer programs.

An access request is received by a computer system 104 (202). As used herein, an access request refers to any request to access a computer system 104, to access or use a service provided by a computer system 104, or opening an account for access or use of the computer system or services provided by such. Examples of access requests include an attempt to open an account, an attempt to login to a computer system or a service, or an attempt to send an email message or post a message to a forum. The access request may be sent from a client 102 or some other computer or device. The sending of the access request may be initiated by a human user or a computer program (e.g., a script or a bot) acting as a user.

A challenge is generated in response to the access request (204). The challenge is part of a human interaction proof for verifying that the user initiating the access request is a human being and not a computer program. Here, the challenge is a problem involving detection of image orientation, further details of which are described below.

The challenge is transmitted to the client (or other computer or device) from which the user initiated the access request, for display or presentation to the user (206). As displayed to a user, the challenge includes a plurality of images, some of which are not "upright." In some embodiments, the images are displayed at specified dimensions (e.g., 160 by 160 pixels). If an image is larger than the specified dimensions, it may be resealed to the specified dimensions for display.

The challenge as displayed includes a question to the user concerning the orientations of the plurality of images. In some embodiments, the question asks the user to identify the images that are not "upright." In some other embodiments, the question asks the user to identify the images that are "upright." At the client, the user formulates the response and initiates transmission of that response to the computer system 104.

In some embodiments, the challenge generation and transmission may occur at different rates for different types of access requests. For example, the challenge generation may always occur in response to an account opening attempt, but occur at specified or determined probabilities or rates in response to other types of access requests, such as an attempt to send an email message. Furthermore, the probability or rate may be based on any combination of a variety of factors, such as number of access requests or attempts by a user within a time interval, whether past emails sent by the user have indicia of spam, and so forth.

The response to the challenge is received by the computer system 104 (208). The response includes the answer of the user to the question concerning the orientations of the images. If the response to the challenge is correct (210—yes), the access request is granted or accepted (212). Otherwise (210—no), the access request is denied (214). If the request is denied and the user repeats the attempt, the user may be presented with more challenges until the user stops making the access requests or responds correctly to a challenge.

Figure 3:
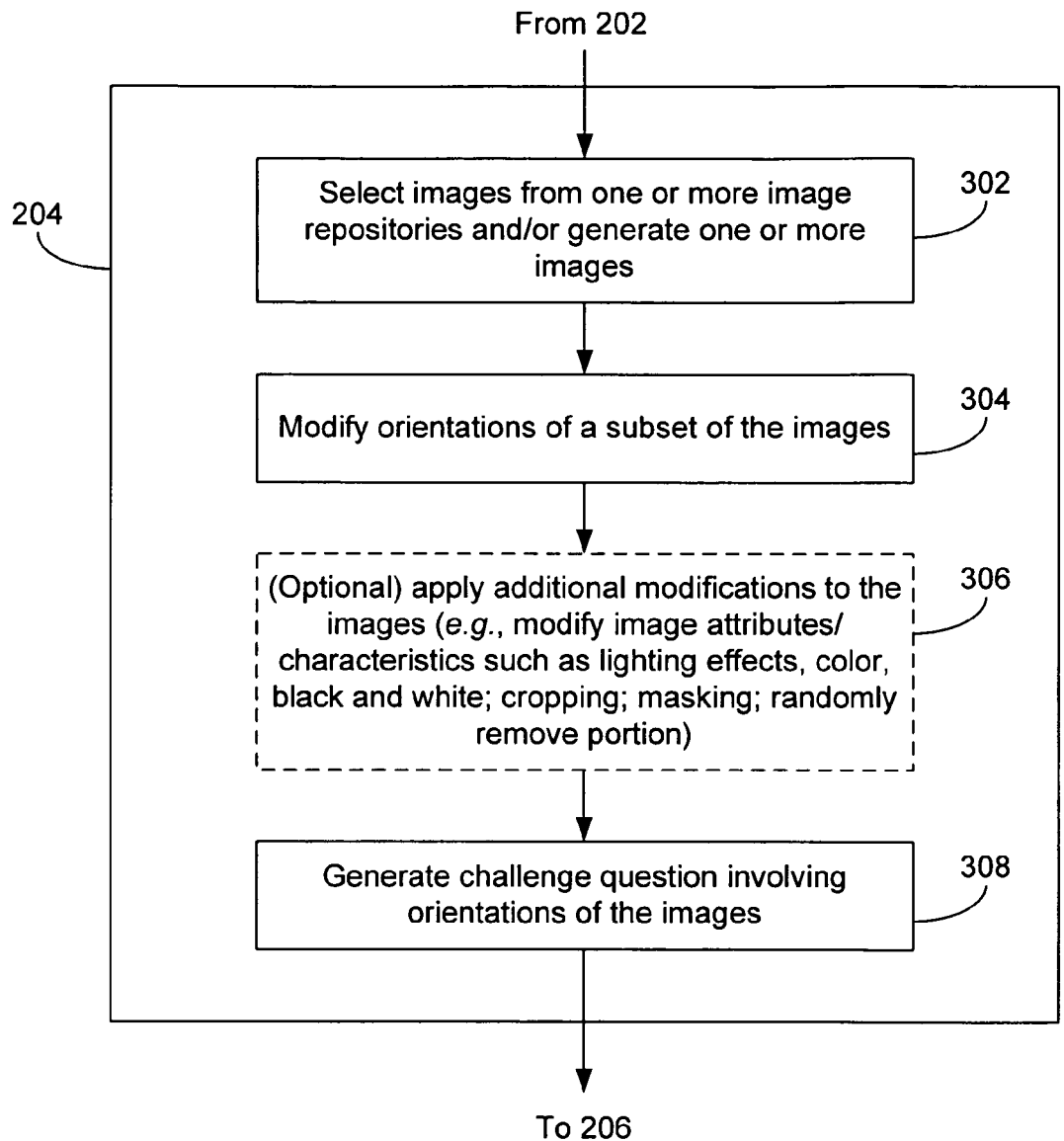
FIG. 3 is a flow diagram illustrating a process for generating a human interaction proof involving rotated images in accordance with some embodiments.

FIG. 3 is a flow diagram illustrating a process for generating a human interaction proof involving rotated images, in accordance with some embodiments. As described above, in block 204 a challenge involving orientations of a plurality of images is generated. FIG. 3 illustrates in further detail a process for generating a challenge.

After an access request is received, a predefined number of images for a challenge are selected from one or more image repositories (302). In some embodiments, 10 images are selected. In some other embodiments, more or less images may be selected. The images may be selected randomly or pseudo-randomly. In some embodiments, the image repositories may include an image database. The Internet, particularly the World Wide Web, may also be considered as an image repository from which images may be selected, as there are a vast number of images that are available on the Internet. The collection of Internet-accessible images may be indexed by an image search engine. In some other embodiments, images may be generated by the computer system 104 for use in the challenge. Alternatively, the plurality of images may include both generated images and images from image repositories.

As described above, images may be generated for use in the challenge. The types of images that may be generated include image types that are known in the current or future state of the art as difficult for computers to detect orientation. An example of a type of image that is difficult, with respect to the current state of the art, for computers to detect orientation is cartoon images. The types of images that may be generated for use in the challenge may vary as the state of the art in the field of automatic image orientation detection develops further.

In some embodiments, the images that are candidates for inclusion in a challenge are inputted into an automated image orientation analyzer for testing. The automated image orientation analyzer may be one that implements automatic image orientation detection techniques that are now known or later developed. In some embodiments, the automated image orientation analyzer implements one or more automatic image orientation detection techniques that are the best available. The automated image orientation analyzer attempts to detect the orientation of the candidate images and rotations thereof. Candidate images for which the analyzer can detect orientations with high degrees of accuracy and at high confidence levels are rejected from inclusion in the challenge. In some embodiments, candidate images for which the correct orientation is detected with high accuracy and at a high confidence level may be saved from rejection and selected for inclusion in a challenge if modified with respect to lighting, color, etc., further details of which are described below. On the other hand, candidate images for which the analyzer has difficulty detecting orientations may be selected for inclusion in the challenge. Thus, the analyzer test acts as a filter for eliminating from inclusion in challenges candidate images that may be easy for computers.

In some embodiments, there may be a repository of screened images that have been screened as suitable for use in challenges and from which images may be selected for inclusion in challenges. Initially, the screened image repository includes a seed set of images that have been tested with both actual human testers and with an automatic image orientation analyzer. The screened image repository may be further populated with images drawn from repositories of unscreened image such as an image database or the Internet. As used herein, "unscreened" means that the image has not been tested by human testers or included in actual challenges for identification by users on a probational basis. The tests and probational inclusion in challenges help eliminate candidate images that are relatively difficult for humans with respect to orientation detection. Images may be selected for inclusion in a challenge from both the screened image repository and, on a probational basis, from the unscreened image repository. That is, a challenge may include images from both screened image and unscreened image repositories.

Figure 7:
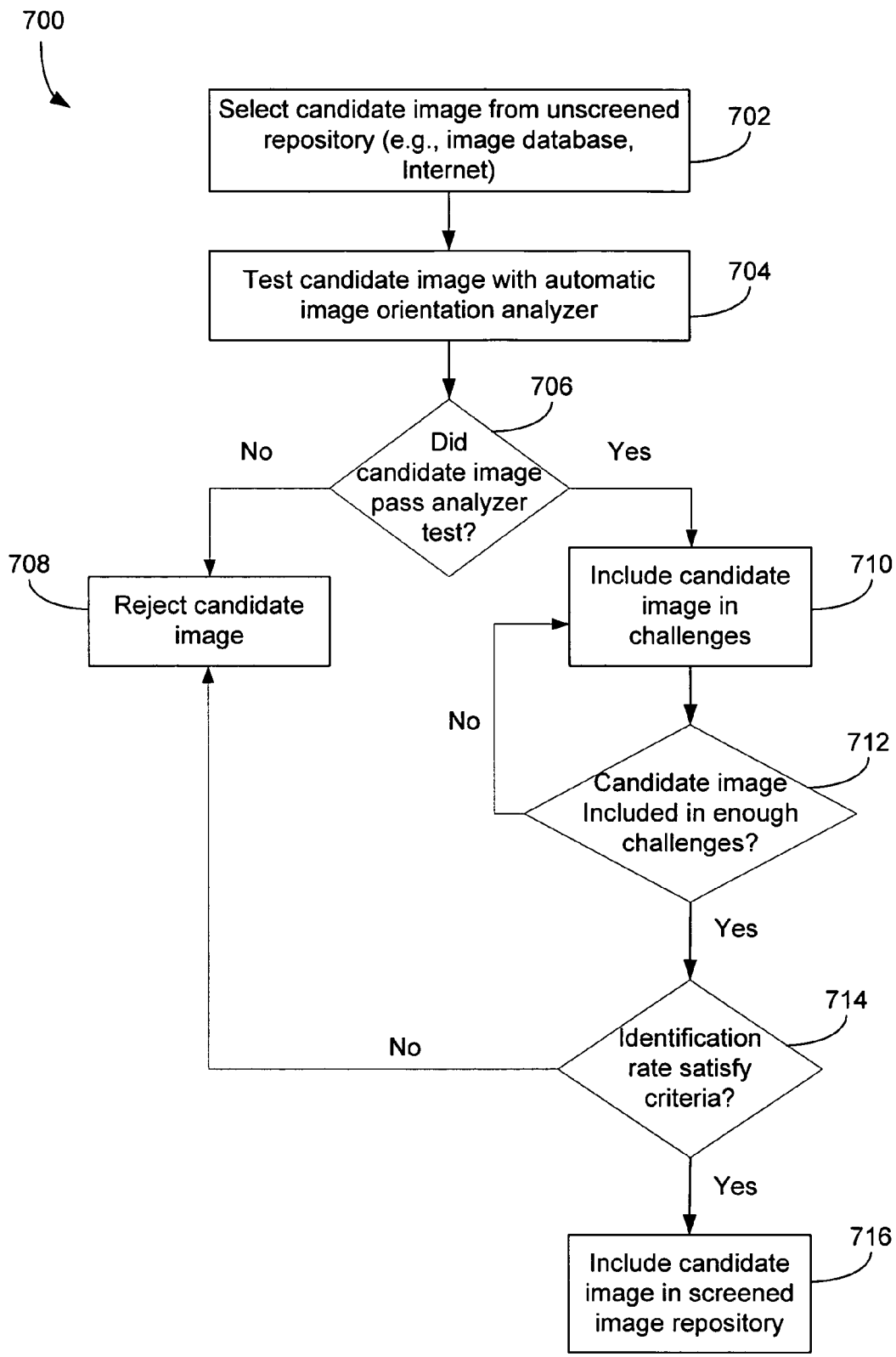
FIG. 7 is a flow diagram illustrating a process for adding an image to a screened image repository in accordance with some embodiments.

Referring to FIG. 7, process flow 700 describes a process for selecting an image from an unscreened image repository, including that image in challenges, and possibly adding that image to the screened image repository. A candidate image is selected from an unscreened image repository (702). As described above with respect to block 302 (FIG. 3), an image may be selected randomly or pseudo-randomly. The candidate image is tested with an automatic image orientation analyzer (704), as described above. If the candidate image does not pass the analyzer test (706—no), the candidate image is rejected (708). If the candidate image passes the analyzer test (706—yes), the candidate image may be included in challenges (710). In some embodiments, the candidate image "passes" the analyzer test if the analyzer incorrectly identifies the orientation of the image or the analyzer correctly identifies the orientation of the image but at a confidence level that is below a threshold. The threshold confidence level may be predefined. In some embodiments, the threshold confidence level is 20%; the "passing" confidence level is 20% or lower. In embodiments where none or less than all of the orientation detections include a confidence level value, a candidate image may be analyzed by multiple orientation detection analyzers and the candidate image "passes" if a predefined number (an absolute number or a percentage) of the analyzers correctly identifies the orientation of the candidate image.

In some embodiments, the candidate images selected from the unscreened image repository may be tested by a plurality of different automatic image orientation analyzers. A candidate image may be accepted or rejected based on the number or percentage of orientation analyzers that successfully identify the orientation of the image. For example, a candidate image may be rejected if 20% or more of the analyzers successfully identify the orientation of the image.

As the candidate image is included in challenges, statistics regarding the number of correct and incorrect identifications may be collected for the candidate image. When the identification statistics for a particular candidate image satisfy predefined criteria, that image may be added to the screened image repository. One example of the predefined criteria may be that the image is correctly identified by users 100 times without any intervening incorrect identification. Another example of the predefined criteria may be that the candidate image has at least a 95% correct identification rate based on at least 500 challenges in which the candidate image is included. More generally, if the candidate image has been included in a sufficiently large sample size of challenges (712—yes), the correct identification rate is considered. If the correct identification rate exceeds a predefined threshold (714—yes), the candidate image is added to the screened image repository (716). If the sample size is not large enough (712—no), the consideration of the correct identification rate is postponed as the candidate image is included in more challenges. If the sample size is large enough and the correct identification rate does not exceed the predefined threshold (714—no), the candidate image is rejected.

Thus, a candidate image may be selected from an unscreened image repository for inclusion in challenges. If the candidate image passes an initial test (the automatic image orientation analyzer fails to detect orientation correctly with a threshold level of certainty), then the image is included in challenges on a probational basis. If the correct identification rate of the image by users exceeds a threshold, suggesting that humans have relatively little difficulty detecting the orientation of the image, then the candidate image may be added to the screened image repository and it is no longer on probation status. Otherwise, the candidate image may be rejected.

Referring back to FIG. 3, the orientations of a subset of the images to be included in the challenge are modified (304). That is, a subset of the plurality of images is selected and the images in the selected subset are rotated away from their upright orientations. As used herein, an "upright" image means that the image is in its proper orientation. In some embodiments, the proper orientation is the orientation of the image as it appeared in the image repository, i.e. the original orientation. In some other embodiments, the proper orientation may be based on other criteria. For example, the proper orientation may be whatever orientation conforms best to common sense. An image in the subset may be rotated away from the proper orientation by any angle between 0° and 360°, non-inclusive. In some embodiments, an image in the subset may be rotated by 90°, 180°, or 270°. In some embodiments, the images that are to be rotated are randomly or pseudo-randomly selected from amongst the plurality of images.

Optionally, additional modifications may be applied to the images (306). In some embodiments, additional modifications may be made to the images (both the ones that are rotated and ones that are not) in order to make the challenge more difficult for computers. Examples of the modifications that may be applied to the images include modifying the lighting effects or properties of the images, modifying the color properties of the images, cropping the images, removing a random portion from each image, and masking the images. An example of modifying the color properties of the images is converting the images into black-and-white or gray-scale images. Another example is to change the color of the blue sky in the image, if there is any. Cropping an image may include trimming all around the image a predefined number of pixels per dimension or only particular sides. Removing a portion of an image may include removing a random quadrant of the image.

More generally, modifications to the images may include changes to the attributes or characteristics of the image or removing content from the image; the modifications are targeted to image attributes or characteristics or content that may provide to a computer clues regarding the orientation of the image. It should be appreciated that the list of possible modifications described above are merely exemplary; other modifications that further complicate the image orientation detection task for computers may be used. It should be further appreciated that the types of modifications that may be applied to the images may vary as the state of the art in the field of automatic image orientation detection develops further; different types of modifications may be applied to counter improvements in automatic image orientation detection techniques as they arise.

The question for the challenge is generated (308). As described above, the question concerns the orientations of the images. In some embodiments, the question asks the user to identify the images that are not upright (or are upright). More generally, in some embodiments, the set of questions that may be generated may be described as: given N images, M images of which are not upright, identify P of the M images that are not upright, where $1 \leq P \leq M < N$; or alternatively, identify Q of the N–M images that are upright, where $1 \leq Q \leq (N-M) < N$. Each generated challenge may have different values of N, M, P, and Q. Thus, the actual question and the correct answer may vary across challenges, and the difficulty of the questions may vary across challenges because the probability of getting the correct answer by guessing changes with the different values. Setting P=M (or Q=N–M) means that the user must identify all of the images in the plurality of displayed images that are not upright (or are upright).

In some embodiments, the challenge may also require that the user not incorrectly identify an image (e.g., selecting an upright image as non-upright, failing to select a non-upright image as non-upright when the question asked for all non-upright images, etc.). In some other embodiments, a response to a challenge may still be considered correct even if the response does not identify all of the non-upright images required by the question (or upright images if the question asks for such). For example, if the challenge question was "to identity all of the images that are not upright" (where there are at least two images that are not upright) or "to identify five images that are upright," a response that missed one non-upright image or identified only four out of the required five upright images, respectively, may still be considered correct.

As described above in relation to block 206 (FIG. 2), the generated challenge is transmitted to the client (or other computer or device) for display to the user.

Figure 4:
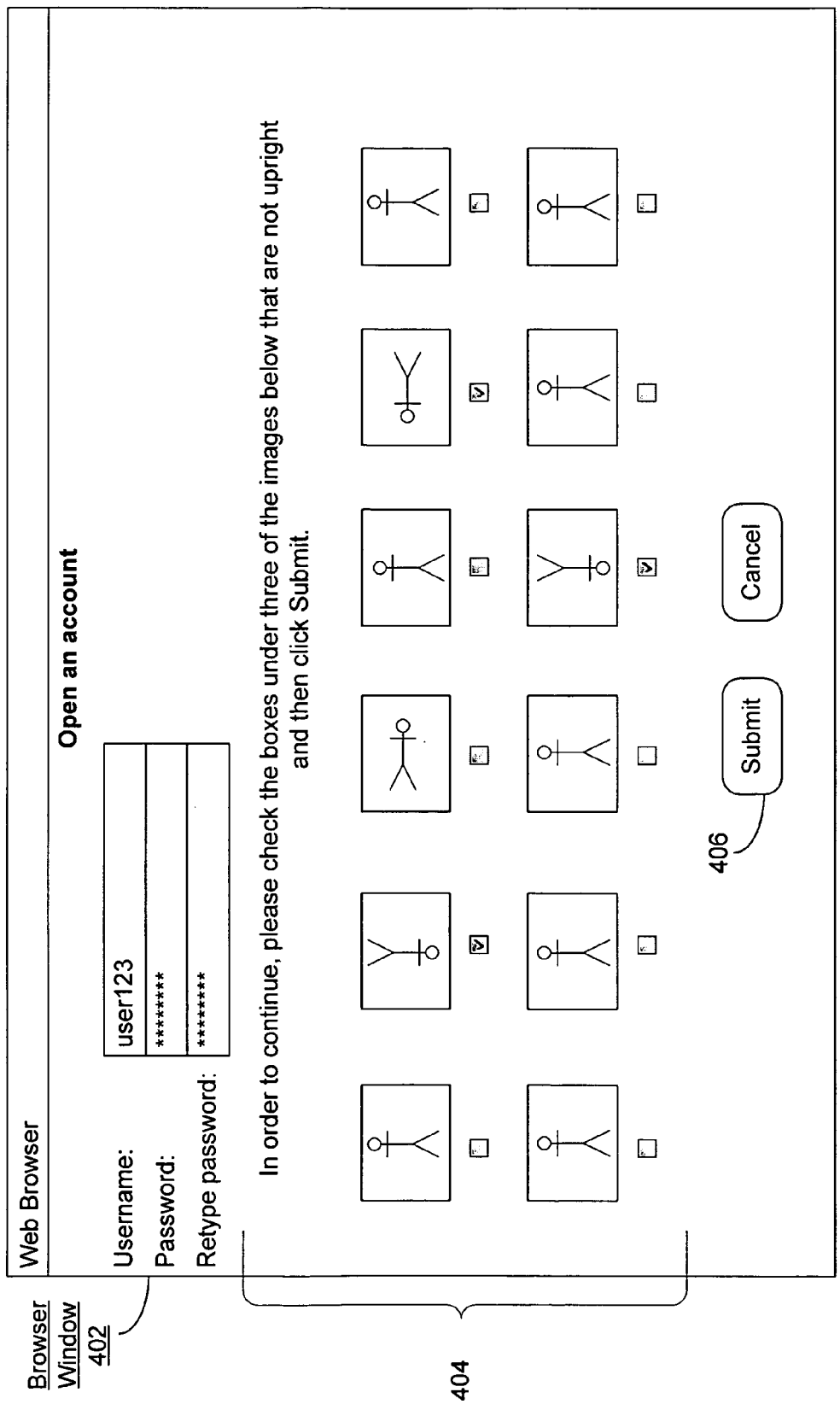
FIG. 4 illustrates an exemplary user interface for a human interaction proof involving rotated images, in accordance with some embodiments.

FIG. 4 illustrates an exemplary user interface for a human interaction proof involving rotated images, in accordance with some embodiments. FIG. 4 shows an exemplary account opening interface in a web browser window 402. The interface includes common user interface components such as text fields for the username and the password. The interface also includes an exemplary human interaction proof (HIP) 404 based on image orientation detection. The HIP 404 includes a plurality of images (e.g., 12 images) and a challenge to the user to identify the images that are not upright. The example images used in HIP 404 are stick figures and rotations thereof. Eight of the stick figures shown in the HIP are upright (head on top and legs on bottom), while the other four are not. Boxes under three of the non-upright stick figures are checked, which is a correct response to the challenge question. Furthermore, none of the boxes under the upright stick figures are checked. If any of the boxes under any of the upright stick figures were checked, then the response would be incorrect because an upright stick figure is incorrectly identified as being not upright.

To continue with the account opening request, the user would click on the Submit button 406. If the response to the HIP 404 is correct, the account opening request is accepted and the process continues. If the response is incorrect, the account opening request is denied, and a message alerting the user to that effect may be shown.

It should be appreciated that HIP 404 is merely exemplary. Other images, formats for presenting the images, questions, and manners of providing the response may be used. Furthermore, the images in the HIP need not be all rotations of the same image. A HIP may present a plurality of different images at once, with some of them rotated.

Figure 5:
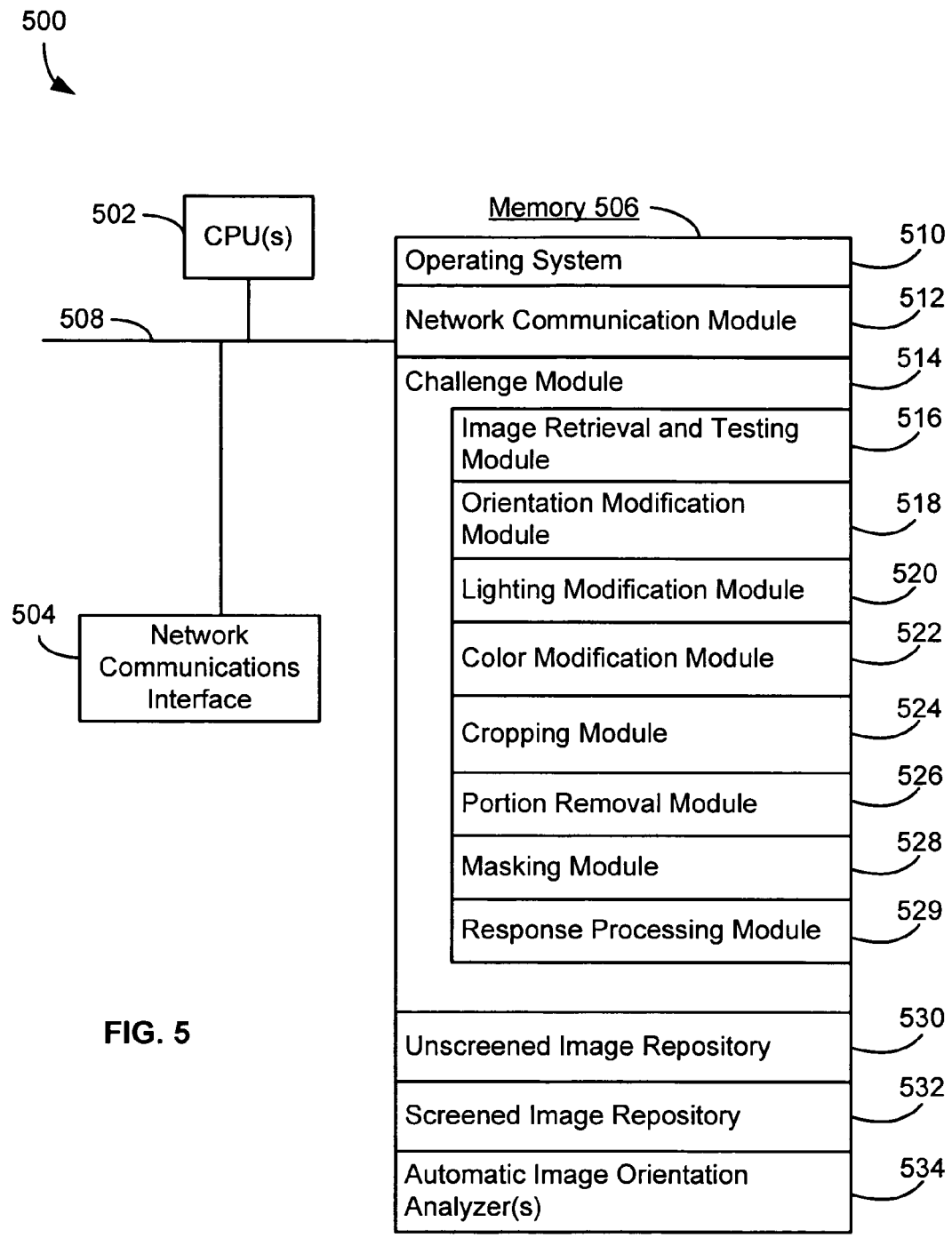
FIG. 5 is a block diagram illustrating a server computer capable of providing human interaction proofs involving rotated images, in accordance with some embodiments.

FIG. 5 is a block diagram illustrating a server 500 in a computer system 104 in accordance with some embodiments. The server 500 typically includes one or more processing units (CPU's) 502, one or more network or other communications interfaces 504, memory 506, and one or more communication buses 508 for interconnecting these components. The server 500 optionally may include a user interface comprising a display device and a keyboard and/or a mouse (not shown). The memory 506 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506, or alternatively one or more storage devices (e.g., one or more nonvolatile storage devices) within memory 506, includes a computer readable storage medium. Memory 506 may optionally include one or more storage devices remotely located from the CPU(s) 502. In some embodiments, the memory 506 or the computer readable storage medium of memory 506 stores the following programs, modules and data structures, or a subset thereof:

- an operating system 510 that includes procedures for handling various basic system services and for performing hardware dependent tasks;
- a network communication module 512 that is used for connecting the server 500 to other computers via the one or more communication network interfaces 504 (wired or wireless), such as the Internet, other wide area networks, local area networks, metropolitan area networks, and so on;
- a challenge module 514 for generating challenges;

an unscreened image repository 530 for storing unscreened images and corresponding statistics regarding correct and incorrect identifications;

a screened image repository 532 for storing images that have been screened for difficulty with respect to computers and ease with respect to humans;

one or more automatic image orientation analyzers 534 for testing the difficulty of detecting orientation of particular images by algorithmic techniques.

The challenge module 514 may include the following sub-modules, or a subset thereof:

an image retrieval and testing module 516 for selecting and retrieving images from various image repositories and the Internet for possible inclusion in challenges and testing the images;

a orientation modification module 518 for rotating certain images to be included in challenges away from their proper orientations;

a lighting modification module 520 for modifying lighting properties of images to be included in challenges;

a color modification module 522 for modifying color properties of images to be included in challenges, including turning images into black-and-white or grayscale images;

a cropping module 524 for cropping images to be included in challenges;

a portion removal module 526 for removing portions of images to be included in challenges;

a masking module 528 for imposing mask images onto images to be included in challenges; and a response processing module 529 for checking challenge responses from users and granting or denying access request based on the responses.

In some embodiments, the lighting modification module 520 includes instructions for performing particular modifications to the lighting of an image. For example, the lighting modification module 520 may include instructions for performing a standard equalization or a reversal of the histogram of an image.

In some embodiments, an additional module or sub-module may include instructions to add noise to an image by randomly or pseudo-randomly modifying the colors or intensities of the pixels that make up the image.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows a server in a computer system, FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a computer system and how features are allocated among them will vary from one implementation to another, and may depend in part on the amount of data traffic that the system must handle during peak usage periods as well as during average usage periods.

Figure 6:
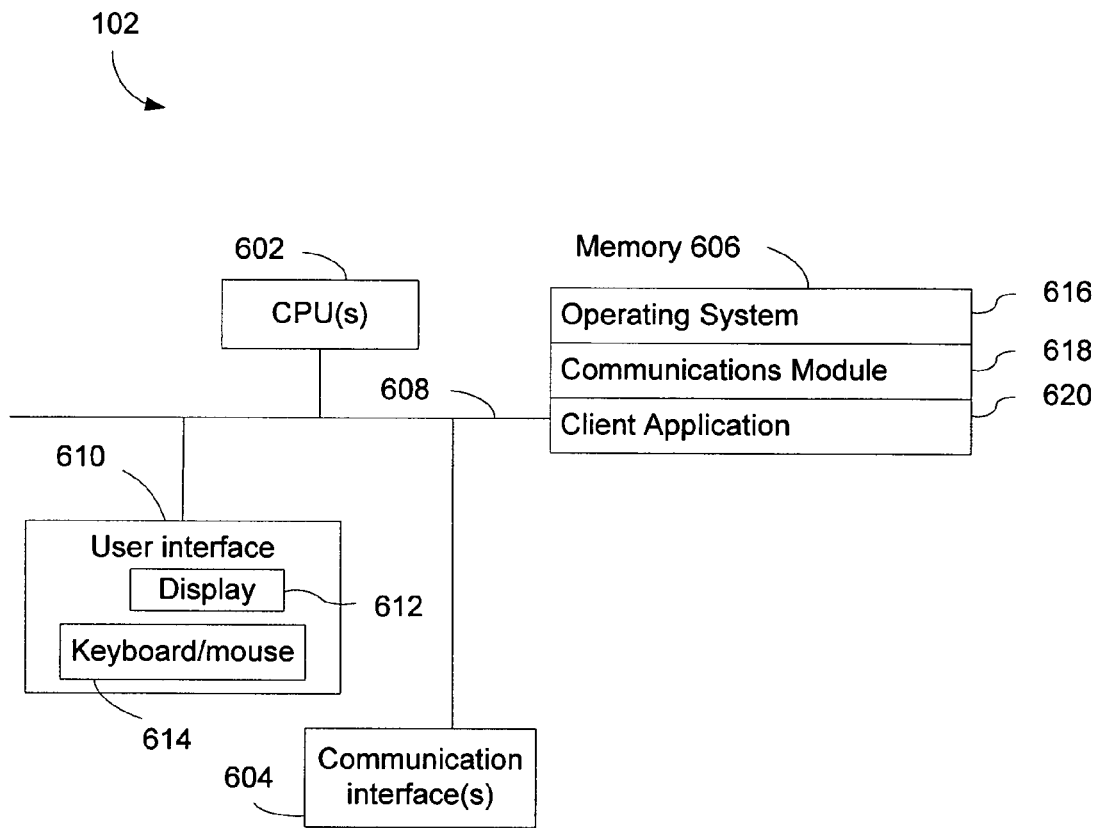
FIG. 6 is a flow diagram illustrating a client computer in accordance with some embodiments.

FIG. 6 is a block diagram illustrating a client 102 in accordance with some embodiments. The client 102 typically includes one or more processing units (CPU's) 602, one or more network or other communications interfaces 604, memory 606, and one or more communication buses 608 for interconnecting these components. The client 102 may also include a user interface 610 comprising a display device 612 and a keyboard and/or mouse 614. Memory 606 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

an operating system 616 that includes procedures for handling various basic system services and for performing hardware dependent tasks;

a network communication module 618 that is used for connecting the client 102 to other computers via the one or more communication network interfaces 604 (wired or wireless), such as the Internet, other wide area networks, local area networks, metropolitan area networks, and so on;

a client application 620 for accessing the computer system 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 may store additional modules and data structures not described above.

As described above, images may be selected for inclusion in the challenges. During the selection process, particular classes of images may be rejected outright, even before any testing by an automatic image orientation analyzer, as being relatively too easy for computers. Generally, such classes may include:

images of text: this turns the challenge into an optical character recognition problem that is similar to text identification CAPTCHAs known in the art;

images of people or animals with faces: facial parts often are indicative of proper orientation; and images having a blue sky and the ground: the blue sky is often an obvious clue to proper orientation.

In some embodiments, these classes of images may be identified algorithmically (as opposed to identification by human review), utilizing techniques known in the art for finding such images. For example, techniques for finding blue sky and the ground in an image is well known in the art and need not be further described. Information regarding finding text in images is disclosed in Wu et al., "Textfinder: An Automatic System to Detect and Recognize Text in Images," *IEEE Transactions on Pattern Analysis and Machine Intelligence*, Vol. 21, no. 11, pp. 1224-1229. November 1999; and Wu et al., "Finding Text in Images," *Proceedings of the Sec-* ond *ACM International Conference on Digital Libraries*, pp. 3-12, 1997, the disclosure of which are incorporated by reference herein. Information regarding finding faces in images is disclosed in Rowley et al., "Neural Network-Based Face Detection," *IEEE Transactions on Pattern Analysis and Machine Intelligence*, Vol. 20, no. 1, pp. 23-38, January 1998; and Viola et al. "Rapid Object Detection using a Boosted Cascade of Simple Features," 2001 *IEEE Computer Society Conference on Computer Vision and Pattern Recognition*, Vol. 1, pp. 511-518, 2001, the disclosures of which are incorporated by reference herein.

In some embodiments, instead of rejecting these images outright, these images may be included in a challenge after modifications are applied to them. The modifications may include ones described above, such as modifications to lighting or color, cropping, and removal of a portion of the image.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of restricting access, comprising:
    at a server having one or more processors and memory storing one or more programs executed by the one or more processors:
        receiving an access request from a client device;
        in response to the access request, generating a challenge, including:
            selecting a plurality of distinct images; and
            modifying orientations of a subset of the selected plurality of images;
        the challenge comprising the selected plurality of images, including the subset of the selected plurality of images having modified orientations, and a question concerning the orientations of the selected plurality of images, including the subset of the selected plurality of images having modified orientations;
        transmitting the challenge to the client device for display;
        receiving a response to the question from the client device; and
        granting the access request if the response correctly answers the question.

2. The method of claim 1, further comprising denying the access request if the response incorrectly answers the question.

3. The method of claim 1, wherein the question comprises asking about at least one image of the plurality of images that have a modified orientation.

4. The method of claim 3, wherein the question comprises asking about all images of the plurality of images that have modified orientations.

5. The method of claim 1, wherein the question comprises asking about at least one image of the plurality of images that does not have a modified orientation.

6. The method of claim 5, wherein the question comprises identification of all images of the plurality of images that do not have modified orientations.

7. The method of claim 1, wherein selecting the plurality of images comprises generating at least a subset of the plurality of images.

8. The method of claim 1, wherein selecting the plurality of images comprises retrieving at least a subset of the plurality of images from one or more image repositories.

9. The method of claim 8, wherein the one or more image repositories comprise a screened image repository and an unscreened image repository.

10. The method of claim 9, further comprising:
    for a respective image in the unscreened image repository, logging statistics regarding identification of the respective image in responses to challenge questions concerning image orientation; and
    if the statistics for the respective image satisfy predefined criteria, adding the respective image to the screened image repository.

11. The method of claim 1, wherein generating the challenge further comprises modifying one or more attributes of respective images in the plurality of images.

12. The method of claim 1, wherein generating the challenge further comprises modifying lighting attributes of respective images in the plurality of images and modifying color properties of respective images in the plurality of images.

13. The method of claim 1, wherein generating the challenge comprises cropping respective images in the plurality of images.

14. The method of claim 1, wherein generating the challenge comprises, for respective images in the plurality of images, removing a portion of the respective image.

15. The method of claim 1, wherein generating the challenge comprises imposing a mask image onto respective images in the plurality of images.

16. A computer-implemented method, comprising:
    at a server having one or more processors and memory storing one or more programs executed by the one or more processors:
        selecting a candidate image from an unscreened image repository;
        performing an image orientation detection test on the candidate image using an automated image orientation analyzer and determining that the test is passed when either the automated image orientation analyzer incorrectly identifies the orientation of the image, or the automated image orientation analyzer correctly identifies the orientation of the image but at a confidence level that is below a predefined threshold;
        if the candidate image passes the test, including the candidate image in a plurality of challenges;
        logging numbers of correct and incorrect identifications of the candidate image in responses to the plurality of challenges; and
        if the numbers of correct and incorrect identifications for the candidate image satisfy predefined criteria, adding the candidate image to a screened image repository.

17. A system, comprising:
    memory;
    one or more processors; and
    one or more modules stored in the memory and configured for execution by the one or more processors, the one or more modules comprising:
        instructions to receive a request to access the system from a client device;
        instructions to, in response to the request, generate a challenge, including:

instructions to select a plurality of distinct images; and instructions to modify orientations of a subset of the selected plurality of images;

the challenge comprising the plurality of images, including the subset of the selected plurality of images having modified orientations, and a question concerning orientations of the selected plurality of images, including the subset of the selected plurality of images having modified orientations;

instructions to transmit the challenge to the client device for display;

instructions to receive a response to the question from the client device; and instructions to grant the request if the response correctly answers the question.

18. A non-transitory computer readable storage medium storing one or more programs for execution by one or more processors of a computer system, the one or more programs comprising instructions for:

receiving an access request from a client device;

in response to the access request, generating a challenge, including:

selecting a plurality of distinct images; and modifying orientations of a subset of the selected plurality of images;

the challenge comprising the selected plurality of images, including the subset of the selected plurality of images having modified orientations, and a question concerning orientations of the selected plurality of images, including the subset of the selected plurality of images having modified orientations;

transmitting the challenge to the client device for display;

receiving a response to the question from the client device; and granting the access request if the response correctly answers the question.

19. The method of claim 1, wherein selecting a plurality of distinct images includes selecting the images randomly or pseudo-randomly from one or more image repositories.

20. The system of claim 17, wherein the instructions to generate the challenge include instructions to modify lighting attributes of respective images in the plurality of images and modify color properties of respective images in the plurality of images.

21. The computer readable storage medium of claim 18, wherein the instructions for generating the challenge include instructions for modifying lighting attributes of respective images in the plurality of images and modifying color properties of respective images in the plurality of images.

22. A system, comprising:
memory;
one or more processors; and
one or more modules stored in the memory and configured for execution by the one or more processors, the one or more modules comprising:

instructions to select a candidate image from an unscreened image repository;

instructions to perform an image orientation detection test on the candidate image using an automated image orientation analyzer and determining that the test is passed when either the automated image orientation analyzer incorrectly identifies the orientation of the image, or the automated image orientation analyzer correctly identifies the orientation of the image but at a confidence level that is below a predefined threshold;

instructions to, if the candidate image passes the test, include the candidate image in a plurality of challenges;

instructions to log numbers of correct and incorrect identifications of the candidate image in responses to the plurality of challenges; and instructions to, if the numbers of correct and incorrect identifications for the candidate image satisfy predefined criteria, add the candidate image to a screened image repository.

23. The system of claim 22, wherein the one or more modules include instructions to retrieve one or more images from the image repository for use as human interaction proofs.

24. A non-transitory computer readable storage medium storing one or more programs for execution by one or more processors of a computer system, the one or more programs comprising instructions for:

selecting a candidate image from an unscreened image repository;

performing an image orientation detection test on the candidate image using an automated image orientation analyzer and determining that the test is passed when either the automated image orientation analyzer incorrectly identifies the orientation of the image, or the automated image orientation analyzer correctly identifies the orientation of the image but at a confidence level that is below a predefined threshold;

if the candidate image passes the test, including the candidate image in a plurality of challenges;

logging numbers of correct and incorrect identifications of the candidate image in responses to the plurality of challenges; and if the numbers of correct and incorrect identifications for the candidate image satisfy predefined criteria, adding the candidate image to a screened image repository.

25. The computer readable storage medium of claim 24, wherein the one or more programs include instructions for retrieving one or more images from the image repository for use as human interaction proofs.

26. The method of claim 16, further comprising retrieving one or more images from the screened image repository for use as human interaction proofs.

* * * * *